United States Patent [19]

Loucks

[11] Patent Number: 5,764,984
[45] Date of Patent: Jun. 9, 1998

[54] SYSTEM FOR MULTIPLE CO-EXISTING OPERATING SYSTEM PERSONALITIES ON A MICROKERNEL

[75] Inventor: Larry Keith Loucks, Austin, Tex.

[73] Assignee: International Business Machines Corporation, Armonk, N.Y.

[21] Appl. No.: 760,158

[22] Filed: Dec. 3, 1996

Related U.S. Application Data

[63] Continuation of Ser. No. 23,666, Feb. 26, 1993, abandoned.

[51] Int. Cl.⁶ .................................................. G06F 13/00
[52] U.S. Cl. .................................................. 395/682
[58] Field of Search ........................................ 395/682

[56] References Cited

U.S. PATENT DOCUMENTS

| | | | |
|---|---|---|---|
| 4,722,048 | 1/1988 | Hirsch et al. | 395/700 |
| 4,835,677 | 5/1989 | Sato et al. | 395/700 |
| 4,961,133 | 10/1990 | Talati et al. | 395/700 |
| 5,109,515 | 4/1992 | Laggis et al. | 395/610 |
| 5,136,711 | 8/1992 | Hugard et al. | 395/700 |
| 5,179,703 | 1/1993 | Evans | 395/700 |
| 5,265,252 | 11/1993 | Rawson, III et al. | 395/700 |
| 5,278,973 | 1/1994 | O'Brien et al. | 395/700 |
| 5,341,499 | 8/1994 | Doragh | 395/200.01 |
| 5,361,358 | 11/1994 | Cox et al. | 395/700 |
| 5,363,121 | 11/1994 | Freund | 395/671 |
| 5,369,749 | 11/1994 | Baker et al. | 395/674 |
| 5,381,534 | 1/1995 | Shi | 395/650 |
| 5,471,615 | 11/1995 | Amatsu et al. | 395/682 |
| 5,483,647 | 1/1996 | Yu et al. | 395/700 |
| 5,485,579 | 1/1996 | Hitz et al. | 395/677 |
| 5,497,463 | 3/1996 | Stein et al. | 395/650 |
| 5,513,328 | 4/1996 | Christofferson | 395/200.13 |
| 5,537,417 | 7/1996 | Sharma et al. | 395/200.02 |

*Primary Examiner*—Kevin A. Kriess
*Assistant Examiner*—John Q. Chavis
*Attorney, Agent, or Firm*—Mark S. Walker

[57] ABSTRACT

A system and method for concurrently operating multiple operating system environments on a hardware platform. A dominant personality server is provided to control basic system configuration and resources. Subdominant servers are provided to support applications for other operating systems. Binary compatibility is supported for each dominant and subdominant operating system personality. Personality neutral services are extracted from each operating system environment and coalesced in personality neutral servers. Interprocess communications are implemented using defined object oriented and procedural interfaces. Server response and conflict resolution are handled by the dominant personality neutral server. Any supported operating system can be the dominant server by selection of the operator.

17 Claims, 3 Drawing Sheets

5,764,984

SYSTEM FOR MULTIPLE CO-EXISTING OPERATING SYSTEM PERSONALITIES ON A MICROKERNEL

This is a continuation of application Ser. No. 08/023,666 filed Feb. 26, 1993, now abandoned.

BACKGROUND OF THE INVENTION

The patent application is related to the application entitled "Method and Apparatus for Interprocessor Communication" having attorney docket number AT993-024 and application Ser. No. 08/023,644, now abandoned. It is also related to "System and Method for Lazy Loading of Shared Libraries" having attorney docket No. AT993-025 and application Ser. No. 08/023,643, now abandoned. These applications are both assigned to the assignee of the present invention.

1. Field of the Invention

The present invention relates generally to information handling systems, and more particularly to operating systems. Still more particularly, the present invention relates to the use of a microkernel architecture to support multiple co-existing operating system personalities.

2. Background and Related Art

Computer operating systems control the operation of computer hardware resources to perform useful tasks. The development of operating systems has historically been undertaken by hardware manufacturers to provide operating systems to control their particular brand of hardware. The advent of "open" systems has changed the focus of operating system development. "Open" systems are expected to operate on multiple hardware platforms with few changes to application program code.

The accelerating pace of computer hardware change has also impacted operating system development. Continually changing hardware increases the effort and cost needed to adapt existing operating systems to the new hardware platform.

These trends have caused the computer industry to explore alternate methods of operating system development. Carnegie Mellon University has undertaken a project to develop a "microkernel" architecture. They have developed the Mach Microkernel that has been provided to and adapted by a number of hardware vendors. The microkernel approach attempts to isolate the control of basic hardware resources from the characteristic interfaces of the operating system environment. The hardware control processes are grouped into a minimal ("micro") kernel of function. Adaptation of this code to new hardware architectures is much easier than adapting a larger operating system in which hardware dependencies are scattered throughout. In addition, the interfaces to the microkernel remain constant so that higher layers of the operating system need not be changed to adapt to new hardware.

The microkernel approach has been suggested as a method for rapidly adapting operating systems to new hardware platforms and for allowing multiple operating systems to be rapidly adapted to existing platforms It has been proposed to supply either a single or multiple operating system personality with each system product for a particular hardware architecture. See "A Catalyst for Open System", by Richard Rashid, *Datamation*, May 15, 1989, pp 32–33 for additional background.

The developers of the Mach Microkernel at CMU have proposed supporting multiple operating system personalities running on a single microkernel. This approach is discussed in "Generalized Emulation Services for Mach 3.0—Overview, Experiences and Current Status", *USENIX Association—Mach Symposium Proceedings*, November 1991, pp 13—26.

The above article proposes to provide multiple target operating systems through emulation. An emulation library is associated with each emulated process to provide an emulation of the operating system environment required by that process. The proposed systems mix specialized operating system emulation with generic servers for handling common tasks such file management, terminal communications and process management. The generic servers execute as separate processes and communicate with the emulation library through Mach messages.

The CMU approach, however, is not sufficiently generalized to concurrently support multiple operating systems without significant performance penalties. The emulation libraries proposed by CMU run within the application process address space. Much of the operating system complexity must be embedded in the emulation libraries creating large and complex libraries. Each application using an emulated library is required to load that library into its address space. Memory overhead and system resource consumption become critical issues. Finally, since each supported operating system is emulated they all suffer the performance degradation created by an emulation environment.

The cost effective development of operating environments able to support multiple operating system personalities requires that common elements between the operating systems be extracted and coalesced into a limited number of processes. It is also desirable to provide an ability for a system user to select a single dominant personality to control overall system function while allowing the use of other operating system personalities as needed.

The technical problem addressed by the present invention is to develop a system and method for efficiently supporting concurrent multiple operating system personalities on a hardware system. A second problem is to provide effective means for communicating with the hardware resources necessarily shared by the multiple systems.

SUMMARY OF THE INVENTION

The present invention is directed to solving these problems by implementing a system and method for supporting multiple concurrent operating system personalities.

The present invention provides a system having components for coordinating resources between operating system personalities and for effectively communicating between the personalities. Methods of effective communication are also disclosed.

The present invention is directed to a system for supporting multiple co-existing operating systems, having means for performing basic kernel services, dominant personality means for controlling overall system operation by providing operating system services according to a first operating system protocol, application interface means for receiving a request for operating system services from an application program, secondary personality means for providing operating systems services according one or more operating system protocols different from the first operating system protocol, interface means for linking the means for performing basic kernel services, the dominant personality means, the application interface means, and the secondary personality means.

It is therefore an object to provide concurrent operating system support transparent to the application process.

It is yet another object of the present invention to provide concurrent multiple operating system support without performance advantage to the dominant personality.

It is yet another object of the present invention to provide a system for preserving legacy operating system applications.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
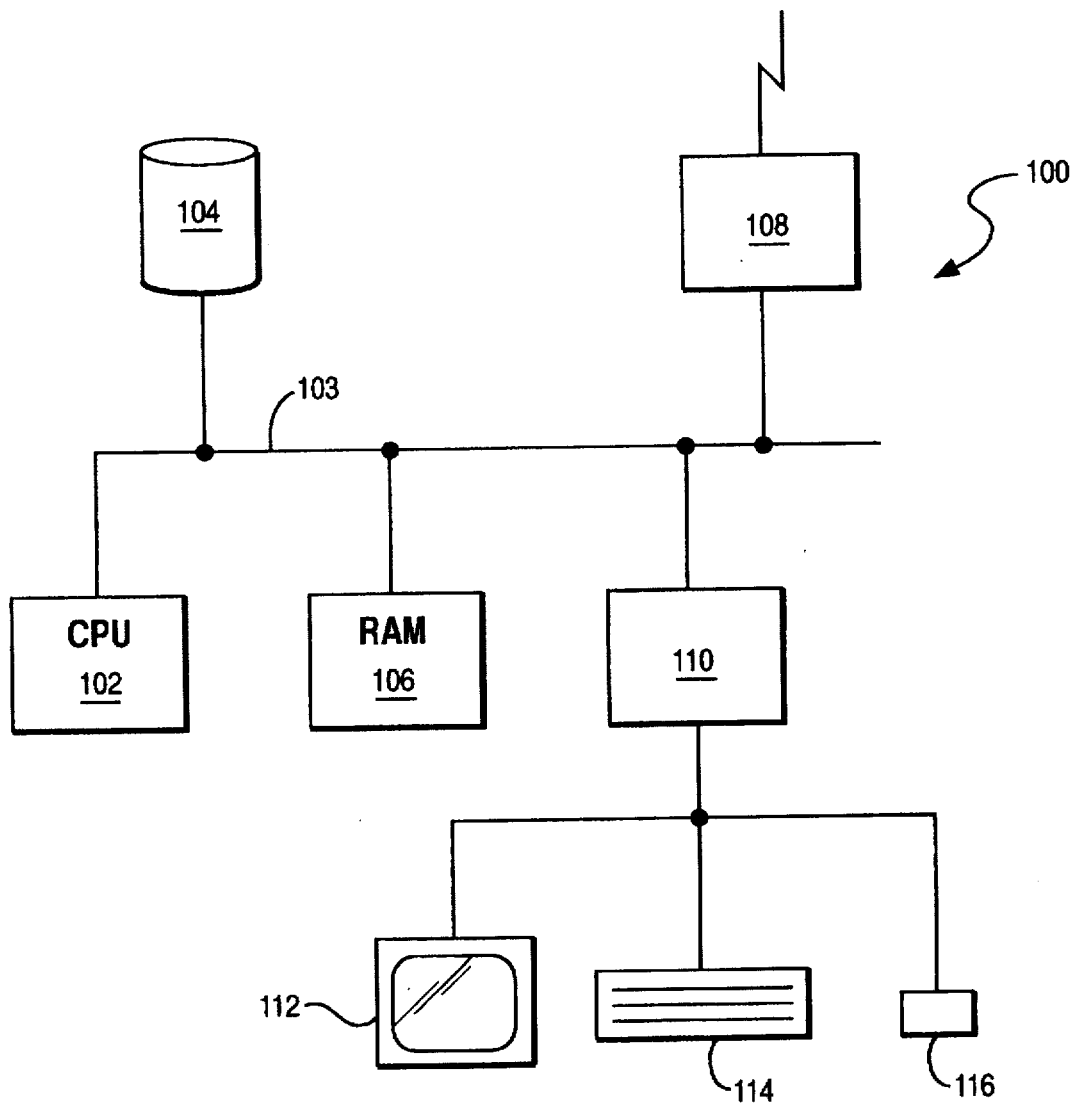
FIG. 1 is a block diagram of a computer system capable of implementing the preferred embodiment of the present invention.

A microkernel is designed to encapsulate the hardware control processes for a particular hardware architecture in a single, easily modified microkernel. This approach is designed to allow use of a microkernel interface on a number of different hardware architectures. FIG. 1 illustrates an example hardware configuration on which a microkernel based operating system would operate. The basic components include one or more processing units or CPUs 102, hard disk or other permanent storage 104, random access memory 106, network communications support via an adapter 108, and input output support to display devices 112, keyboards 114 and pointing devices 116 through I/O controller 110. These components communicate over a system bus 103.

The generalized system of FIG. 1 is embodied in a number of commercially available systems such as the IBM PS/2 computer and the IBM RISC System/6000 computer. (PS/2 and RISC System/6000 are trademarks of IBM Corp.) The concurrent operating system support of the present invention is designed to function on either of these or any new hardware architecture adapted to run the microkernel.

Figure 2:
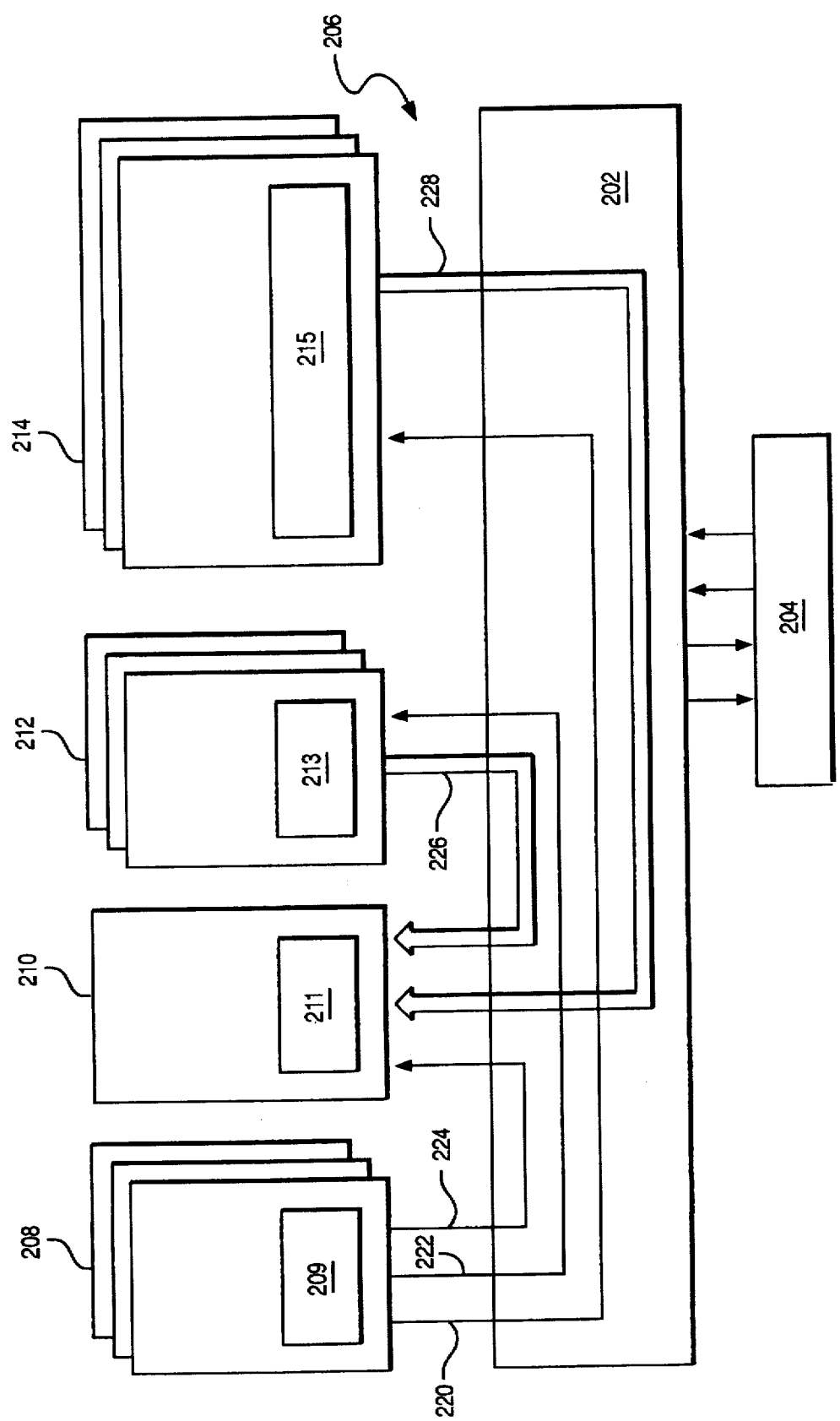
FIG. 2 is a block diagram of the system according to the preferred embodiment of the present invention.

The system of the present invention is shown generally in FIG. 2. The basic microkernel layer is shown at 202. The microkernel provides standard interfaces to the hardware layer 204 and standard interfaces to the operating systems personalities 206. The main components of the present invention that implement concurrent operating system support are shown at 208, 210, 212, and 214. These components are linked by defined interfaces 209, 211, 213, and 215.

The system of the preferred embodiment has a dominant personality server 210 that provides overall control to the hardware system. The dominant personality server is given control during the initial booting of the hardware system and establishes the basic operating system components. It also coordinates access to shared system resources such as communications adapters and the display device. The dominant personality server 210 communicates with other processes through interfaces 211.

Interfaces 211 include object oriented interfaces as well as standard procedural interfaces. The object oriented interfaces are responsive to object messages sent by the dominant personality or to the dominant personality. The procedural interface is a more traditional application programming interface (API) that accepts certain command or routine calls with parameters. The interface 211 communicates with the other processes through the Mach microkernel messaging services.

Personality neutral services 212 are provided to support general tasks that need not have an operating system flavor. Examples are file systems, communication transport services and distributed systems services. These personality neutral services accept process requests from any operating system personality and supply the necessary services. Coordination of these services is through object oriented and procedural interfaces 213.

Alternate operating system personalities are implemented as sub-dominant personality servers 214. Each of these servers interfaces with the microkernel and the other servers through interface 215. The alternate personalities provide operating system environments for those environments different than the dominant personality environment. In addition, personality unique services may be further separated.

Applications executed by the system or user are shown at 208. The applications execute without knowledge of the dominant personality or the microkernel. Each executes as though its target operating system was in full control of the computer hardware.

Application processing occurs as follows. An application begins execution in an application task area. Whenever the application makes an operating system specific request, that request is transformed by the object oriented and procedural framework 209 into a request for services by the microkernel, a sub-dominant personality server, a personality neutral server or the dominant personality server. These requests are shown by arrows 220, 222, and 224 in FIG. 2. The application requests are serviced and replies made directly to the application, or, as required they may be coordinated by the dominant personality server 210 (e.g. arrows 226,228). This allows control of, for example, writing to the screen.

Figure 3:
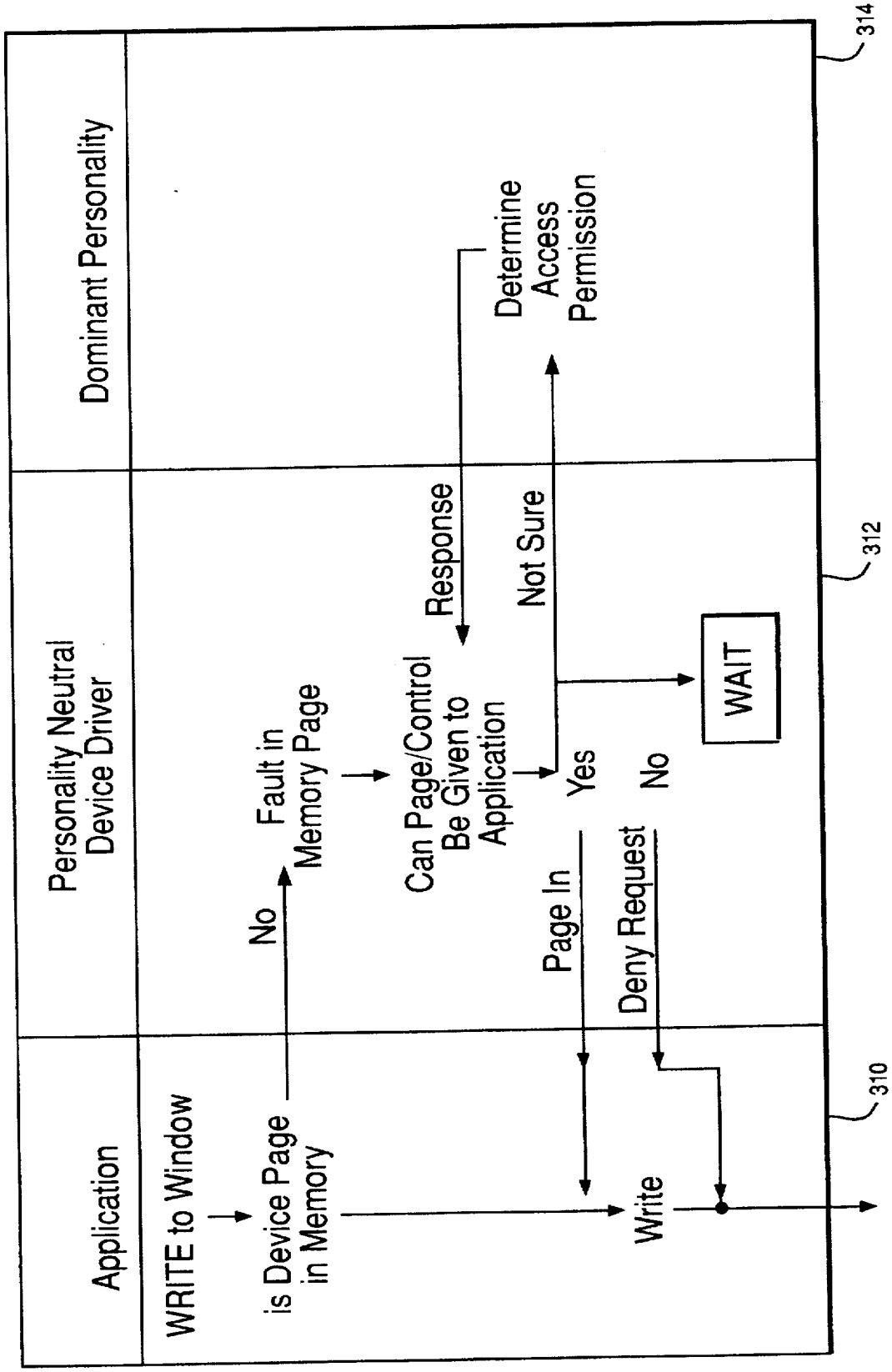
FIG. 3 is a flow chart depicting the process steps involved in application use of the preferred embodiment of the present invention.

A more detailed flow of interprocess communication is shown in FIG. 3. FIG. 3 is divided into three sections each representing the address space of an application task, a personality neutral server, and a dominant personality server. These three are used as examples only. Similar communications paths are used with other servers.

An application program running in application address space 310 may desire to write data to a window on the display terminal screen. The request is made according to the operating system protocol known to the application. The write request is intercepted by the interface and a processing determination made. First, the interface checks to see whether the display device page is in the application address space memory and whether the task has access to that page. If so, the interface can write directly to the display. If not, a memory page fault is raised.

The memory page fault causes a message to be sent to the terminal device driver in the personality neutral services address space 312. The device driver attempts to fault the needed page into the application memory. The device driver first checks to see whether the requesting process may be given access to the page, whether it must be denied access to the page, whether it should wait for the page, or whether the decision must be left to the dominant personality server. If the device driver knows the status it can immediately grant, deny or delay the request without sending a message to the dominant server. The device driver replies directly to the application process.

If a decision is required, a message is sent to the dominant personality server address space 314. The dominant personality applies rules for granting or denying access and then responds to the device driver which in turn responds to the application.

A similar process is employed when the application is using an operating system environment other than the dominant personality. In that case, service requests that cannot be handled by the interface logic are sent to the sub-dominant personality server task for action. The sub-dominant personality servers must send messages to the dominant personality server whenever system policies need to be applied. The dominant personality server resolves all resource conflicts.

The system of the present invention, in operating, requires little extra overhead to support concurrently running operating system environments. In monolithic operating systems or in single personality implementations of Mach there is typically a request from an application to the system level or kernel for service. Mach may handle the message directly or route it for server handling, but the Mach architecture adds little overhead to this transaction. The message based implementation of the preferred embodiment attempts to adhere to that model of minimal message traffic. Applications using the dominant personality should perceive the same response as they would get in a single operating system implementation. Most sub-dominant personality request will be similarly quickly handled. Only resource contention exceptions will suffer the added message traffic of checking with the dominant personality server.

The present invention thus provides a system that achieves the objectives of coordinated processing for multiple operating systems, and does so with minimal overhead.

The selection of the dominant personality is made by the system administrator or system installer. Each available operating system is supplied in a dominant and subdominant form. The administrator selects which is to be the dominant personality and all others are provided as sub-dominant. Note that the sub-dominant personalities are not slaves to the dominant server. They still represent complete operating system environments, except that certain functions have been reserved to the dominant personality.

The provision of multiple concurrent operating system personalities allows system users to continue to use legacy application written for DOS, Windows, OS/2, AIX, UNIX (Unix is a registered trademark in the United States and other countries licensed exclusively through X/Open Company, Ltd., or other operating systems while moving to newer operating system models. This structure also makes development of new operating systems and adaptation to new hardware more easy for the developers. In particular, the investment in existing operating system services is protected.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. A method of concurrently operating multiple operating system environments, each of said operating system environments accessible to any of a plurality of application tasks, said operating system environments interacting with a processor system having a computer processor means and memory, said method comprising the steps of:

booting a first operating system as a dominant operating environment process providing physical system coordination services to all sub-dominant operating system personalities;

loading a plurality of sub-dominant operating system environments as separate processes independent of said first dominant operating environment process;

executing an application program as an application process; and servicing interprocess communication requests between said application process and said dominant operating environment process, said sub-dominant operating system environments using kernel services.

2. The method of claim 1, wherein said kernel services are microkernel services.

3. The method according to claim 1, further comprising the step of:

loading one or more personality neutral servers responsive to messages from said dominant operating environment and said plurality of sub-dominant operating system environments.

4. A system for concurrently executing multiple cooperating operating systems in a computer system executing a plurality of processes, the system comprising:

means for performing basic kernel services for a plurality of operating system personalities and including at least interprocess communication;

dominant personality means for controlling system operation and providing operating system services according to a first operating system protocol;

application interface means for receiving a request for operating system services from an application program;

secondary personality means for providing operating systems services according an operating system protocol different from said first operating system protocol, said secondary personality means cooperating with said dominant personality means to obtain one or more physical system services, said secondary personality means operating in response to said request for operating system services; and interface means for linking for interprocess communication said dominant personality means, said application interface means, and said secondary personality means to said means for performing basic kernel services, and to each other through said means for performing basic kernel services.

5. The system of claim 1, wherein said means for performing basic kernel services is a microkernel operating environment.

6. The system of claim 1, wherein said interface means includes:

means for evaluating and acting on object oriented messages; and means for evaluating and acting on procedural calls.

7. The system of claim 1, wherein the dominant personality means is a UNIX operating environment.

8. The system of claim 7, wherein the secondary personality means is selected from the following operating system personalities: an OS/2 operating environment, a DOS operating environment, and a MacIntosh operating environment.

9. The system of claim 1, wherein the dominant personality means is an OS/2 operating environment.

10. The system of claim 9, wherein the secondary personality means is selected from the following operating system personalities: a UNIX operating environment, a DOS-based operating environment, and a MacIntosh operating environment.

11. A computer program product for use with a computer system, said computer program product comprising:

computer usable medium having computer readable program code means embodied in said medium for causing concurrent execution of multiple operating systems, said computer program product having:

computer readable program code means for causing said computer system to perform basic kernel services for a plurality of operating system personalities and including at least interprocess communication;

computer readable program code dominant personality means for causing said computer system to provide operating system services according to a first operating system protocol;

computer readable program code application interface means for causing said computer system to receive requests for operating system services from one or more application programs;

computer readable program code secondary personality means for causing said computer system to provide operating systems services according one or more operating system protocols different from said first operating system protocol said secondary personality means cooperating with said dominant personality means to obtain one or more physical system operation services, said secondary personality means being responsive to said requests for operating system services; and computer readable program code interface means for causing said computer system to link for interprocess communication said operating system services according to a first operating system protocol, said application programs, said operating system services according to said one or more operating system protocols different from said first operating system protocol to said basic kernel services, and to each other through said basic kernel services.

12. The computer program product of claim 11, wherein said computer readable program code means for performing basic kernel services is a Mach based microkernel.

13. The computer program product of claim 11, wherein said computer readable program code interface means includes:

computer readable program code means for causing said computer system to evaluate and act on object oriented messages; and computer readable program code means for causing said computer system to evaluate and act on procedural calls.

14. The computer program product of claim 11, wherein the computer readable program code dominant personality means is a UNIX operating environment.

15. The computer program product of claim 14, wherein the computer readable program code secondary personality means include an OS/2 operating environment, a DOS operating environment, and a MacIntosh operating environment.

16. The computer program product of claim 11, wherein the computer readable program code dominant personality means is an OS/2 operating environment.

17. The computer program product of claim 16, wherein the computer readable program code secondary personality means include a UNIX operating environment, a DOS-based operating environment, and a MacIntosh operating environment.

* * * * *